(12) United States Patent
Takegami et al.

(10) Patent No.: US 6,604,154 B1
(45) Date of Patent: Aug. 5, 2003

(54) DATA PROCESSING DEVICE

(75) Inventors: Atsushi Takegami, Yokohama (JP); Mitsuru Shimada, Yokohama (JP); Sachiko Oda, Yokohama (JP); Shinichirou Ikoma, Yokohama (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/458,595

(22) Filed: Dec. 10, 1999

(30) Foreign Application Priority Data

Dec. 10, 1998 (JP) .......................................... 10-350811

(51) Int. Cl.[7] .............................................. G06F 3/00
(52) U.S. Cl. .............................. 710/52; 710/55; 710/54; 370/235; 370/426
(58) Field of Search ............................. 710/52, 55, 54; 370/235, 426

(56) References Cited

U.S. PATENT DOCUMENTS

| | | | | | |
|---|---|---|---|---|---|
| 5,819,031 A | * | 10/1998 | Iwamoto | ..................... | 709/203 |
| 5,864,677 A | * | 1/1999 | Van Loo | ..................... | 370/403 |
| 5,892,979 A | * | 4/1999 | Shiraki et al. | ................. | 710/52 |
| 5,961,623 A | * | 10/1999 | James et al. | ................. | 710/107 |

* cited by examiner

Primary Examiner—Jeffrey A Gaffin
Assistant Examiner—Harold Kim
(74) Attorney, Agent, or Firm—William B. Kempler; W. James Brady, III; Frederick J. Telecky, Jr.

(57) ABSTRACT

Deter the lowering of the efficiency of data exchange in a data processing device that conducts data communications by using a serial bus conforming to the IEEF 1394 Standards.

6 Claims, 5 Drawing Sheets once, the data processing device $101$ transmits a

DATA PROCESSING DEVICE

TECHNICAL FIELD OF THE INVENTION

This invention relates to a data-processing device, in particular, it relates to a data processing device that is used in a system that conducts transmitting and receiving of data in packet units through the medium of a serial bus that conforms to the IEEE 1394 standards.

BACKGROUND OF THE INVENTION

In the past, in order to accept image and voice data, and control an AV machine with a data-processing device such as a personal computer, a video capture board, an RS232C bus, and the like were individually required, and unified handling could not be done.

Thus, in recent years standards suited to data transmission in the multimedia era have been proposed, for example, by means of the "IEEE 1394 High Performance Serial Bus Standards" (hereinafter, called IEEE 1394 Standards), and environmental improvements have been made to be able to freely conduct high speed, high volume communications.

One example of a conventional data processing device is shown at key 101 of FIG. 4. This data processing device 101, along with another data processing device that is not illustrated, is connected to an IEEE 1394 bus 106. The IEEE 1394 bus 106, which conforms to the IEEE 1394 Standards, is a serial bus in which the propagation of data in packet units is possible, the data processing device 101 transmits a request packet and receives only an acknowledge signal through the medium of the IEEE 1394 bus 106, but by receiving a response packet in addition to the acknowledge signal the exchange of data with another data processing device can be done.

The data processing device 101 has a microcomputer 102, a transmitting device 103, and a receiving device 104. Among these, the transmitting device 103 and the receiving device 104 are arranged in parallel between the microcomputer 102 and the IEEE 1394 bus 106.

An explanation is given in regard to the case wherein this type of data processing device 101 conducts the exchange of data with another data processing device while referencing the flow chart of FIG. 5. This is a flow chart showing the processes that the transmitting device 103 conducts in the interval of transmitting a request package, and the keys $S_{101}$ to $S_{106}$ show each processing step.

First, the microcomputer 102 creates request packets based on a prescribed program, and outputs them one after another to the transmitting device 103. Each request packet carries the information from the data processing device 101, which is the transmitting source, and includes the recognition information that recognizes the request package, the information that specifies another data processing device for the transmit destination of the request packet, and information for the purpose of specifying the data to be read out.

The transmitting device 103 has an internal buffer memory (not illustrated) that sequentially holds the request packets that are successively input in the buffer memory, reads these out one at a time, and sends them to the IEEE 1394 bus 106 $S_{101}$.

The transmitting device 103 sends a request packet, outputs recognition information for the request packet that has been sent to the receiving device 104, and, along with notifying the receiving device 104 of the purpose that a request packet has been sent, transitions to an input wait condition for an acknowledge signal $S_{102}$, and until the acknowledge signal, explained below, signal is input, it cannot transmit a new request packet.

When the request packet is sent to the IEEE 1394 bus 106, the other data processing device (hereinafter, called the other party data processing device) that was specified by the contents of the request packet sequentially receives the request packet from the IEEE 1394 bus 106, reads out its content, and sends an acknowledge signal corresponding to that content to the IEEE 1394 bus 106. What is referred to as an acknowledge signal is information made up of either of "acceptance confirmation" or "pending," and is a signal that is sent for the purpose of notification of the report that the request packet has been received. The acknowledge signal of acceptance confirmation is sent in the event the response packet is deemed unnecessary, and the acknowledge signal of pending is sent when it is deemed respectively that the response packet is necessary.

After a prescribed time has elapsed after the request packet is received, in the event neither of the acknowledge signals are input to the transmitting device 103 from the receiving device 104, the transmitting device 103 determines that an error has been generated, notifies that purpose to the microcomputer 102, and shifts to error processing $S_{103}$.

On the other hand, in the event an acknowledge signal is input to the transmitting device 103 from the receiving device 104, the input acknowledge signal is detected, and a determination is made as to whether that acknowledge signal is an acknowledge signal of acceptance confirmation $S_{104}$. In the event it is an acknowledge signal of acceptance confirmation, the transmitting device 103 determines that the transaction has been completed, and one processing series relating to the transmission of one request packet is completed. When the processing series is completed, the transmitting device 103 transitions to a condition in which it is possible to transmit a new request packet.

On the other hand, in the event the acknowledge signal that has been received is not an acknowledge signal of acceptance confirmation, but is an acknowledge signal of pending, the transmitting device 103 shifts to the response signal wait condition $S_{105}$. When it shifts to this response signal wait condition, the transmitting device 103 transitions to a condition in which a new request packet cannot be transmitted until the fact that the previously mentioned response packet has been received is acknowledged.

The other party data processing device that has sent the acknowledged signal of pending in response to the content of the received request packet generates a response packet containing recognition information, information that specifies the transmission source and transmission destination, information that specifies the other data processing device of the transmission destination for the request packet, information for the purpose of specifying the data that is to be read out, and the like, and sends it to the IEEE 1394 bus 106.

If the receiving device 104 has received the response packet, receiving device 104 outputs recognition information for the response packet that has been received to the transmitting device 103, and notifies it of the purpose that the response packet has been received.

When the fact that the response packet has been received is confirmed by means of this notification, the transmitting device 103 assumes that there is a completion of that transaction and shifts to a condition in which transmission of the next request packet is possible.

The receiving device 104, when it is notified of the purpose that the response packet has been received, outputs that response packet to the microcomputer 102. The microcomputer 102 conducts processes such as storing the input response packet in a prescribed memory device.

If there is not a notification of the purpose that the response packet has been received even after a fixed time has elapsed after the acknowledge signal of pending has been input, the transmitting device 103 determines that an error has been generated, notifies the microcomputer 102 of that purpose, and shifts to error processing $S_{106}$.

As was explained above, this data processing device 101 can conduct the exchange of data by transmitting a request packet and receiving a corresponding response packet.

However, with this data processing device 101 there is a problem that, since the determination processes must be conducted for determining whether or not an acknowledge signal has been input $S_{102}$, determining whether or not the input acknowledge signal is acceptance confirmation $S_{104}$, and determining whether or not the response packet has been received $S_{105}$, there is the problem that the processing load for the transmitting device becomes excessive.

Also, since the transmitting device 103 is designed not to transmit a request packet in the interval of the input wait condition for the acknowledge signal and the receive wait condition for the request packet even if new request packets are continuously created by the microcomputer 102, there is a problem generated wherein the efficiency at the time of transmitting a request packet is decreased since the generated request packets cannot be continuously transmitted in the interval of the receive wait.

SUMMARY OF THE INVENTION

This invention was originated for the purpose of solving the aforementioned unfavorable conditions of the past, and its purpose is to offer technology that improves the request packet transmission efficiency in a data processing device that can be connected to an IEEE 1394 bus.

In order to solve said problems, the data processing device of one aspect of this invention has a processing device that creates a request packet, a transmitting device that is connected to a serial bus transmits said request packet to said serial bus and transitions to a confirmation signal wait condition; a receiving device that is connected to said serial bus receives a response packet and a first confirmation signal or a second confirmation signal that is a response corresponding to said request packet from said serial bus, outputs said first or second confirmation signal to said transmitting device, and outputs said response request to said processing device; a transmission information storage means that stores the transmission information contained in the said request packet; for the purpose of specifying a request packet a reception results storage means that stores reception information contained in said response packet for the purpose of specifying said transmission information and transmission results or the response packet and condition notification information showing the response condition of the response packet; wherein said transmitting device outputs said transmission information to said transmission information storage means at the time of transmitting said request packet, and, in the event said confirmation information is said first confirmation signal, outputs transmit results showing said transmission information and said first confirmation signal to said reception results storage means and transitions to a condition in which it is possible to transmit a new request packet; and wherein said processing device, based on said transmission information stored in said transmission information storage means, and said transmission information and said transmit results stored in said reception results storage means, determines whether or not a series of processes have been normally conducted by means of the transmission of said request packet.

Also, the data processing device of another aspect of the invention is a data processing device recorded in Claim 1, wherein said transmitting device that, in the event said confirmation signal is said second confirmation signal, transitions to a condition in which it is possible to transmit a new request packet; said receiving device receives said response packet and outputs said reception information and said condition notification information to said reception results storage means; and said processing device, based on said transmission information stored in said transmission information storage means, and said reception information and said condition notification information stored in said reception results storage means, determines whether or not a series of processes have been normally conducted by means of the transmission of said request packet.

Also, the data processing device of a third aspect of the invention is a data processing device wherein said transmitting device has a dummy response request packet generating means that, in the event said request packet has not been received even though a prescribed time has elapsed after said second confirmation signal has been received, generates a dummy request packet containing said reception information for the response packet that should have been received, said condition notification information, and the recognition information; said receiving device, along with outputting said reception information and said condition notification information for said dummy response request to said reception results storage means, outputs said dummy response request to said processing device; and said processing device, based on said transmission information stored in said transmission information storage means, and said reception information and said condition notification information stored in said reception results storage means, determines whether or not a series of processes have been normally conducted by means of the transmission of said request packet.

Also, the data processing device of a fourth aspect of the invention is a dated device is constructed so that said request packet, said response packet, and said serial bus conform to the IEEE 1394 Standards.

Also, the data processing device of a fifth aspect of the invention is a data-processing device wherein said transmission information is composed of a destination ID and a tLabel, said reception information is composed of a source ID and a tLabel, and said condition notification information is composed of an rCode.

According to this invention, the transmitting device at the time of receiving a request packet obtains transmission information from the request packet and outputs it to a transmission information storage means, and in the event the content of a confirmation signal (acknowledge signal) is content that a response packet has not been returned, in other words, in the event it is the first confirmation signal, the content of the receive acknowledge signal (transmit results) and the transmission information are output to the reception results storage means.

When this is done based on the transmission information that was input to the transmission information storage means at the time of the request packet transmission, the transmission information that was input to the reception results storage means at the time of the reception of the acknowledge the signal, since the processing device and the content of the acknowledge signal, can determine whether or not the transmit condition (series of processes) was normal for the request packet, it is not necessary for the transmitting device to determine the normal or abnormal transmit conditions as in the past.

Also, in this invention in the event the content of the acknowledge signal is content in which the response packet has been returned—in other words, in the event it is the second confirmation signal—the transmitting device, at the time of transmitting the request packet, obtains the transmission information from the request packet and outputs it to the transmission information storage means; the receiving device, at the time of receiving the response packet, outputs the reception information of the response packet and the condition notification information to the reception results storage means; and the processing device, based on the transmission information, the reception information, and the condition notification information, determines whether or not the answer of the response packet is normal in relation to the transmission of the request packet, and, in the event it determines that it was abnormal, interrupts the transmission of the request packet to the transmitting device.

Because of this, the transmitting device determines whether or not the answer of the response packet to the transmission of the request packet is normal, and it is not necessary to wait for the transmission of the request packet based on that determination.

Therefore, when the transmitting device obtains the transmission report and transmits the request packet, as long as it is not determined at the processing device that an abnormal transmit condition has been generated, the transmission of the next request packet can be done immediately without regard to the receive condition of the response packet, and since the transmission of request packets can be done one after another, the transmission efficiency for the request packets can be improved compared to the past whereby the transmission of a new request packet could not be done in the interval of the response packet receive wait condition.

Furthermore, in this invention in the event the receiving device cannot receive said response packet even if the content of the acknowledged signal is a content in which the response packet is returned, a dummy response packet is generated by a dummy response packet generating means.

Because of this, if condition notification information is carried showing an abnormality in the dummy response packet, even in the case in which the response packet could not be received, a determination can be made by reading out the condition notification information from the dummy response packet as to whether or not the answer of the response packet that responds to the request packet is normal by the same series of processes as when the response packet is received.

Also, since a dummy response packet and a response packet that was normally received can be distinguished by reading out the added information (recognition information) from the dummy response packet in regard to a transaction in which a dummy response packet has been received, the fact that a response packet has been received can be detected, and in regard to that transaction the request packet can be retransmitted.

In the data processing device 1, when the transmission information acquisition section 8 acquires the destination ID and the tLabel and transmits these to the transmit queue 5, the transmitting device 3 can immediately transmit new request packets. As a result of that, even if a response to the request packet fails, since the decision section 11 can detect the fact that the response has failed, in order to provide for a failure of the response in the interval from the transmission of the request packet until the reception of the response packet, the transmission efficiency for the request packet can be increased compared to the past because transmitting device, different than in the past wherein a request packet could not be output, can transmit request packets one after another until the decision section 11 has determined that the response has failed.

As was explained above, since the processing device makes the determination according to this invention, in regard to whether or not the transmit condition for the request packet is normal, and it is not necessary for the transmitting device to make this decision (compared to in the past where the decision process was made by the transmitting device) the processes that the transmitting device can be reduced.

Also, with the process here the reception of the response packet is unnecessary since the processing device can determine whether or not the transmission of the request packet was correct; and since the transmitting device can transmit new request packets one after another until the processing device has determined that an abnormality has been generated in the transmission, the transmission efficiency for the request packet can be increased compared to the past.

Lastly, in the event the receiving device cannot receive the response packet, since a dummy response packet is created, even in the event the response packet cannot be received, a determination can be made as to whether or not the transmission was normal by a series of processes that are the same as when a response packet is received.

BRIEF DESCRIPTION OF THE DRAWINGS

(a): A diagram explaining the format of the request packet (b): A diagram explaining the format of the response packet (c): A diagram explaining the format of a dummy response packet

DESCRIPTION OF THE PREFERRED EMBODIMENTS

Figure 1:
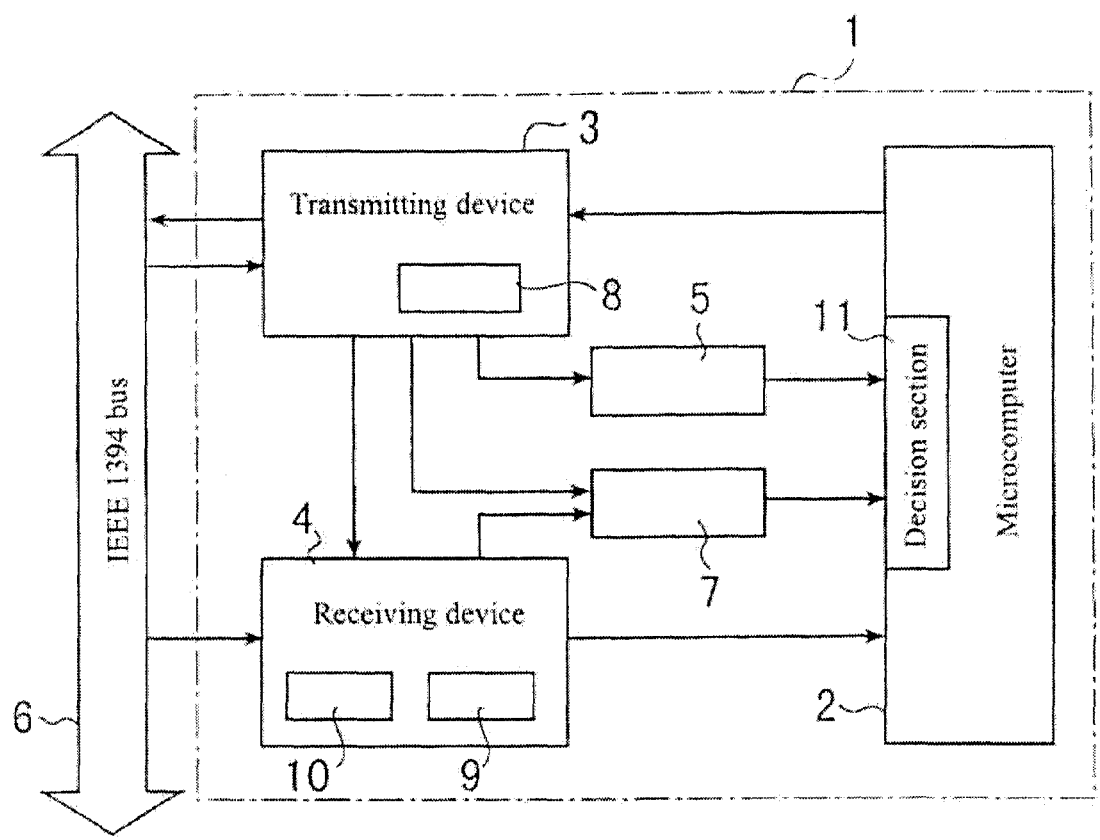
FIG. 1 is a diagram showing the construction of a data processing device of an embodiment configuration of this invention.

A data processing device of this invention is explained by referencing FIG. 1. In FIG. 1, key 1 is a data processing device of an embodiment configuration of this invention.

This data processing device 1 is connected to an IEEE 1394 bus 6 along with a plurality of other data processing devices, and is made such that the exchange of data with other data processing devices can be done through the medium of the IEEE 1394 bus 6.

The data processing device 1 has a microcomputer 2, a transmitting device 3, a receiving device 4, a transmit queue 5, and a receive queue 7. The microcomputer 2 has a decision section 11.

The transmitting device 3 has a transmission information acquisition section 8. Also, the receiving device 4 has a reception information acquisition section 9, and a dummy packet generating section 10.

Among these, the transmitting device 3 and the receiving device 4 are arranged in parallel between the microcomputer 2 and the IEEE 1394 bus 6.

The transmit queue 5 and the receive queue 7 are composed of a memory of a FIFO (First in first out) construction, the transmit queue 5 is installed between the transmission information acquisition section 8 and the decision section 11, and the receive queue 7 between the reception information acquisition section 9 and the decision section 11, respectively.

Figure 2:
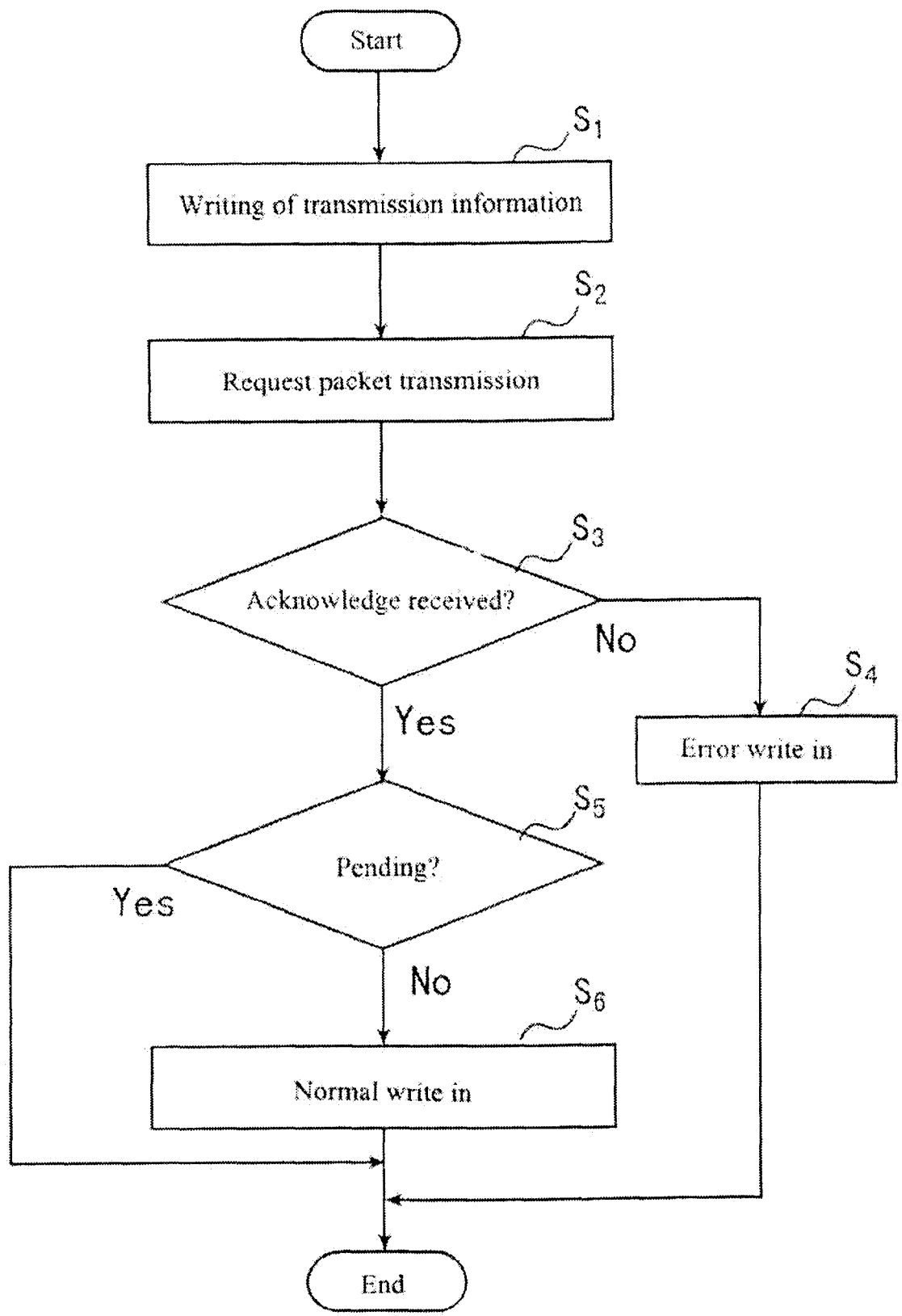
FIG. 2 is a flow chart showing the processes of the transmitting device of this invention.

An explanation is given in regard to a case of this type of data processing device 1 conducting the exchange of data with other data processing devices while referencing the flow chart of FIG. 2. This is a flow chart showing the processes that the transmitting device 3 conducts in the interval of transmitting a request packet, and keys $S_1$ to $S_6$ show each processing step.

First, the microcomputer 2 generates request packets based on a prescribed program, and outputs them one by one to the transmitting device 3.

Figure 3:
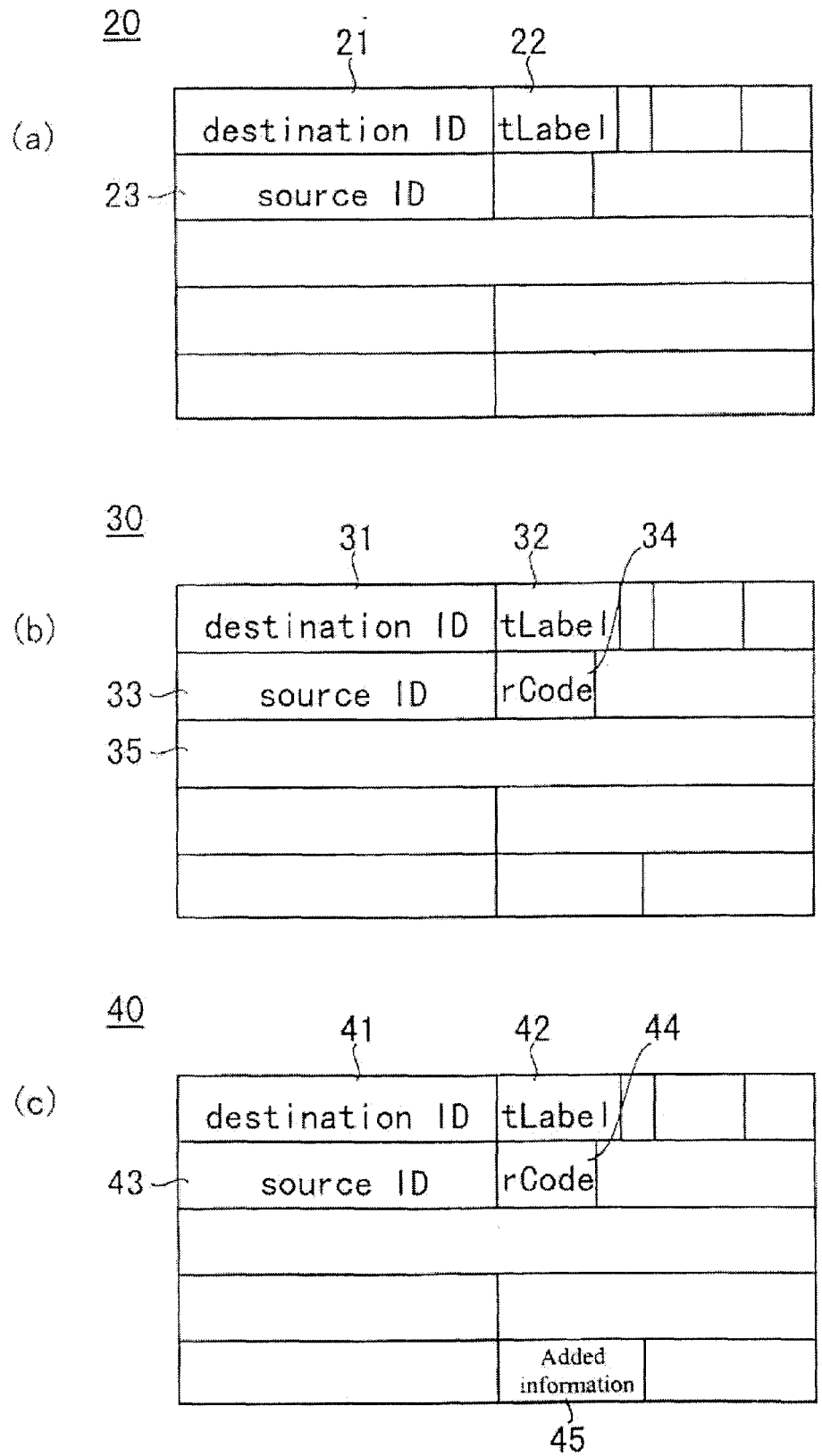
FIG. 3
Figure 4:
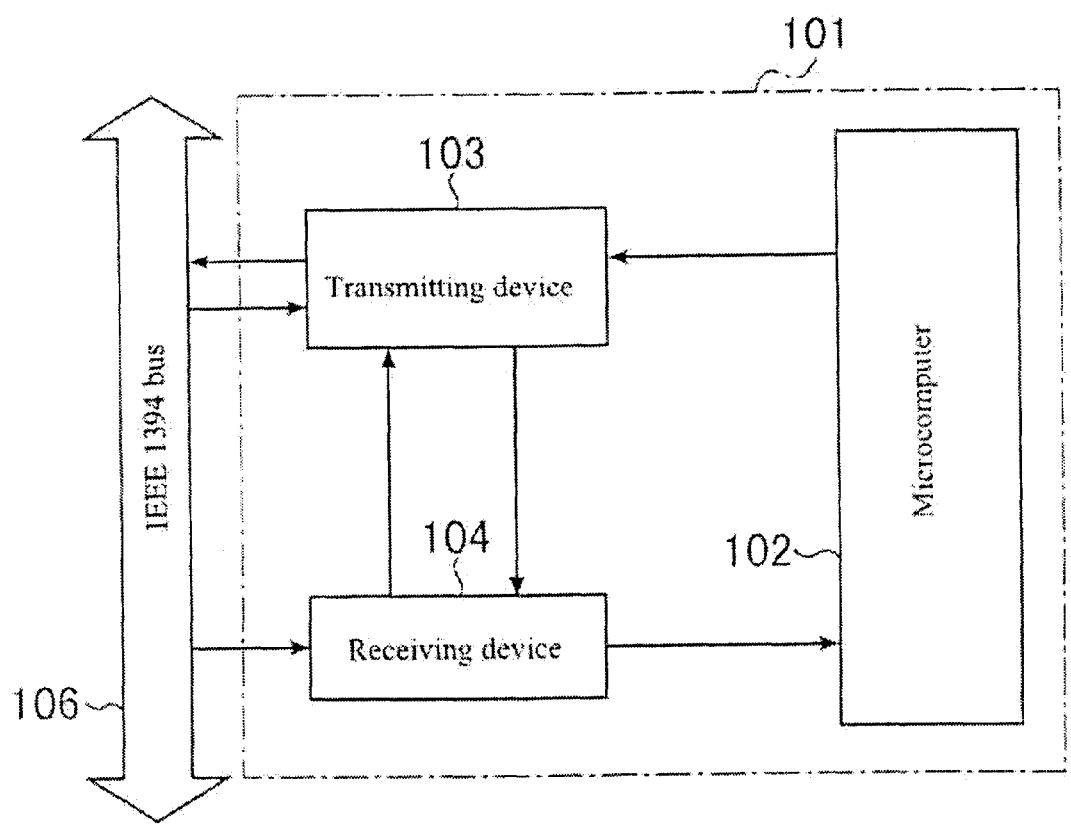
FIG. 4 is a diagram showing the construction of a conventional data processing device
Figure 5:
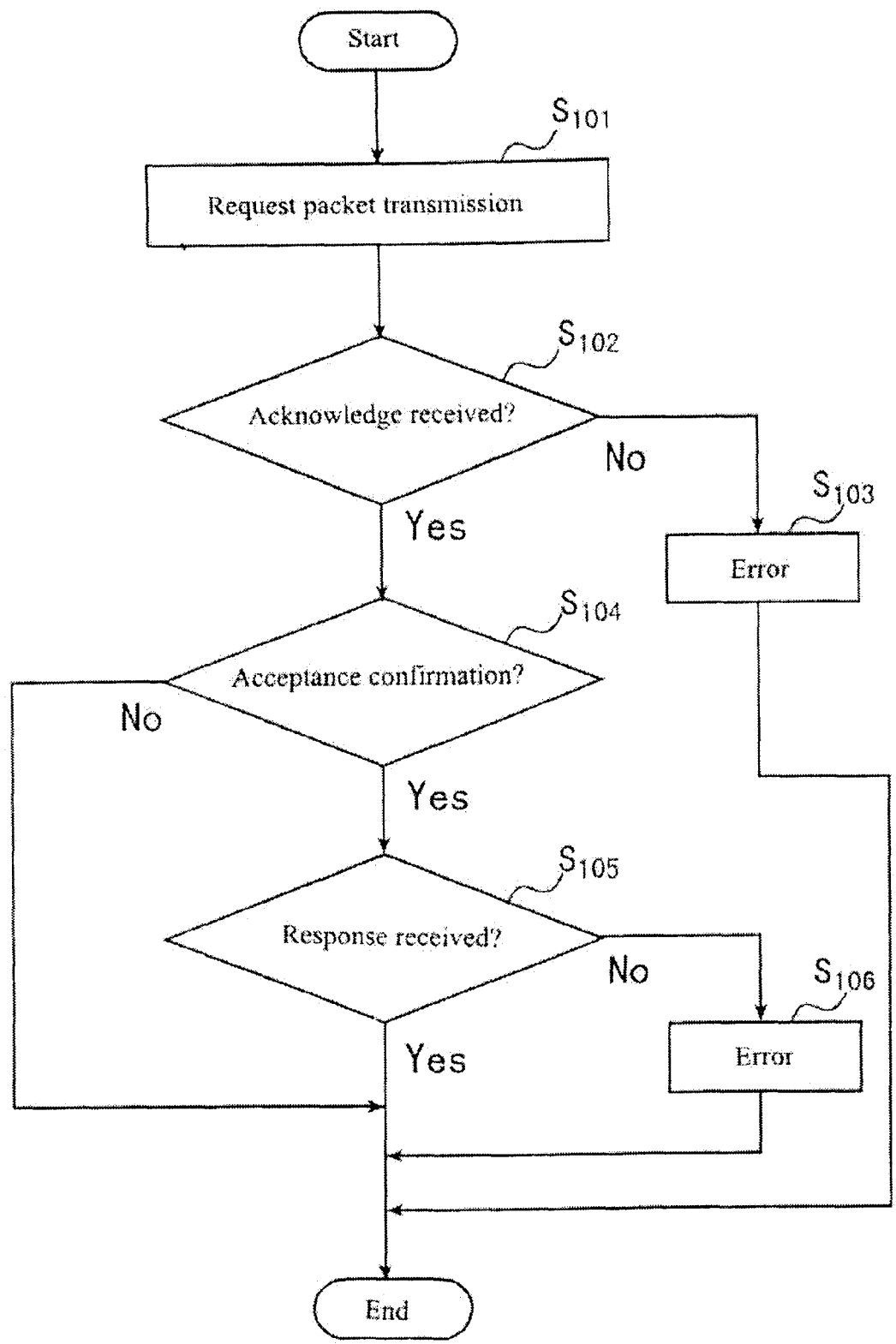
FIG. 5 is a flow chart showing the processes of a conventional transmitting device Explanation of the Reference Numerals 1 Data processing device
2 Microcomputer (processing device)
3 Transmitting device
4 Receiving device
5 Transmit queue (transmission information storage means)
6 IEEE 1394 bus (serial bus)
7 Receive queue (reception results storage means)
8 Transmission information acquisition section
9 Reception information acquisition section
10 Dummy packet creating section
11 Decision section

An outline of the format of a request packet that the microcomputer 2 generates is shown at key 20 of FIG. 3(a). This format 20 has the first to third memory regions 21 to 23, and the destination ID, tLabel, and source ID are respectively recorded in these. The destination ID is information designating the machine of the transmission destination. The tLabel is an intrinsic tag that is allocated to each unresolved transaction. Also, the source ID is information designating the machine of the transmission source.

When request packets are input one after another, the transmitting device 3 successively holds the input request packets in a buffer memory (not illustrated) that is provided internally, and reads them out one at a time.

The transmission information acquisition section (a) acquires the destination ID and the tLabel of the request packet that is read out, attaches correspondence, and outputs it as one set to the transmit queue 5 $S_1$.

When the transmission information acquisition section (a) acquires the set of the destination ID and the tLabel and outputs it to the transmit queue 5, the transmitting device 3 sends the request packet to the IEEE 1394 bus 6 $S_2$.

When the request packet is sent to the IEEE 1394 bus 6, the other data processing device (hereinafter, called the other party data processing device), which the destination ID of the request packet has specified, sequentially receives the request packet from the IEEE 1394 bus 6, reads out its content, and sends an acknowledge signal corresponding to that content to the IEEE 1394 bus 6. What is referred to as the acknowledge signal is information made up of either "acceptance confirmation" or "pending," and both are sent to announce the purpose of having received a request packet, but the acknowledge signal of acceptance confirmation is sent in the event a later explained response packet is not returned, and respectively, the acknowledge signal of pending is sent when a response packet is returned.

When it sends a request packet, the transmitting device 3 transitions to an input wait condition for an acknowledge signal $S_3$, and in the event neither of the acknowledge signals are input to the transmitting device 3 from the receiving device 4 after a prescribed time has elapsed after the request packet is transmitted, the transmitting device 3, in addition to the destination ID and the tLabel of the transmitted request packet, attaches a corresponding transmit results to the purpose that an error has been generated in the transmission, and outputs them as one set to the receive queue 7 $S_4$.

In the event an acknowledge signal is input to the transmitting device 3 from the receiving device 4 within a prescribed interval after the request packet was transmitted, the input acknowledge signal is detected, and a determination is made as to whether or not that acknowledge signal is an acknowledge signal of pending $S_5$. In the event the acknowledge signal is not an acknowledge signal of pending, but is an acknowledge signal of acceptance confirmation, in addition to the destination ID and tLabel of the transmitted request packet, a transmission result to the purpose that the transmission was normally made is output to the receive queue 7 $S_6$; and when that transaction is completed, it immediately shifts to a condition in which the transmission of a new request packet is possible.

At the point in time of steps $S_4$ and $S_6$, the set of destination ID and tLabel of the transmitted request packet are stored in the transmit queue 5, and the set of destination ID, tLabel, and transmission results of the transmitted request packet are stored in the receive queue 7.

The decision section 11 reads out the storage content of the transmit queue 5 and the storage content of the receive queue 7, detects the transmission results of the receive queue 7 with a correspondence to the set of destination ID and t Label that are recorded in the transmit queue 5, determines whether or not a normal transmission was made, and announces that decision result to the microcomputer 2.

At this time, in the event a transmission result to the purpose that an error has been generated is detected, the microcomputer 2 outputs a control command to interrupt the processing to the transmitting device 3, the receiving device 4, and the like; and the series of processes are interrupted and a process such as retransmitting the request packet is conducted. But in the event a transmission result to the purpose that a normal transmission was made is detected, the series of processes is continued.

As for the decision as to whether or not an error was generated, this is made by the decision section 11; and since there is no necessity for the transmitting device 3 to make this type of decision processing and to wait for the transmission of a request packet, the processing of the transmitting device 3 can be reduced, and the processing can be accelerated to a high-speed.

An explanation was given above in regard to a case in which a response packet was not returned, but in the event it is necessary that the other party data processing device send data by returning a response packet to the data processing device 1 (sprint transaction), the other party data processing device transmits an acknowledge signal of pending to the IEEE 1394 bus 6.

If an acknowledge signal of pending is received, the transmitting device 3 assumes a completion in regard to that transaction and immediately shifts to a condition in which the transmission of a new request packet is possible.

A summary of the format of an ordinary response packet that is generated at the other party transmitting device is shown at key 30 of FIG. 3(b). This format 30 has the first to fifth memory regions 31 to 35; and the destination ID, the tLabel, the source ID, the rCode, and the data that is to be transmitted are respectively recorded in these. The destination ID is the information that designates the machine for the transmission destination, and in this case designates the data processing device 1. The source ID is information that designates the machine for the transmission source, and in this case designates the other party data processing device. Also, the tLabel is an intrinsic tag that is allocated to each unresolved transaction, and in this case the same value as the tLabel that is recorded in the corresponding request packet is recorded.

Also, the rCode is 4-bit data, and is a code showing whether or not a response to the request packet was successful. When the value of the rCode shows success, it is successful in the readout of the data corresponding to the demands of the request packet and shows the fact that that data was transmitted. On the other hand, when the value of the rCode shows a failure, data in the fifth memory region 35 are ignored.

The other party data processing device transmits a response packet having this type of format to the IEEE 1394 bus 6.

The receiving device 4 receives the response packet from the IEEE 1394 bus 6. When received, the reception information acquisition section 9 acquires the source ID, the tLabel, and the rCode from the response packet, compiles one set corresponding to these, and outputs it to the receive queue 7.

When this is done, the source ID, the tLabel, and the rCode that were acquired from the receive response packet are made into one set and stored in the receive queue 7, and the set of the destination ID and the tLabel of the receive request packet are stored in the transmit queue 5.

Since the source ID of a response packet that is generated in response to a given request packet and the destination ID of the request packet are the same content, and the tLabel of the request packet and the tLabel of the response packet are also of the same content, the decision section 11 references the storage content of the transmit queue 5, the storage content of the receive queue 7, the set of the destination ID and the tLabel that are stored in the transmit queue 5, and the set of the source ID and the tLabel in which the contents match are detected from the receive queue 7, and by reading out an rCode with a correspondence to the detected set of the source ID and tLabel at the other party data processing device, the response to the transmission of the request packet is successful and it can be determined whether or not the packet has been correctly transmitted.

In the event the decision section 11 detects an rCode reporting that the response from the receive response packet has failed, the microcomputer 2 outputs a control command instructing the interruption of the processes to the transmitting device 3, the receiving device 4, and the like, the processes are interrupted, and a process such as retransmitting the request packet is done; but when an rCode from the receive response packet reporting that a normal transmission has been made is detected, the processes continue.

When the reception information acquisition section 9 reads out the source ID, the tLabel, and the rCode from the response packet and outputs these to the receive queue 7, the receiving. device 4 outputs a response packet to the microcomputer 2. The microcomputer 2 stores the input response packet in a memory region (not illustrated), and completes the one transaction that starts with the transmission of the request packet.

On the other hand, in the event it has shifted to the sprint transaction, the transmitting information acquisition section 8, along with writing the set of the destination ID and tLabel from the request packet being transmitted to the transmit queue 5, also communicates a set of the destination ID and tLabel to the receiving device 4, and in the event the receiving device 4 cannot receive a response packet even after a predetermined fixed time has elapsed after the request packet transmission, the dummy packet creating section 10 generates a dummy packet having a format such as is shown at key 40 of FIG. 3(c), based on the destination ID, tLabel, and the like that were communicated to the receiving device 4.

As is shown in FIG. 3(c), the dummy response packet 40 has the same format as the response packet that is to be received, and has the first to fifth memory regions 41 to 45, in which the destination ID, the tLabel, source ID, rCode, and added information are respectively recorded.

The dummy packet creating section 10 records a destination ID, tLabel, and source ID of the same content as the response packet that is to be received, and along with recording an rCode reporting that an error has been generated, records the additional information. This additional information is to discriminate between the ordinary response packet and the dummy response packet.

When this type of dummy response packet is created, the reception information acquisition section 9 acquires from the dummy response packet the source ID, the tLabel, and the rCode that are recorded in the response packet that is to be received, attaches a correspondence to these, and outputs them as a set to the receive queue 7.

In the event a dummy response packet is created, the source ID, the t Label, and the rCode that were acquired from the dummy response packet are recorded in the receive queue 7, and a set of the destination ID and tLabel of the transmitted request packet is recorded in the transmit queue 5.

Thus, the decision section 11 references the storage content of the transmit queue 5 and the storage content of the receive queue 7, outputs from the receive queue 7 a set of the source ID and the tLabel wherein the contents match the set of the destination ID and the tLabel that are recorded in the transmit queue 5, and by reading out the set of the detected source ID and tLabel and an rCode with correspondence, can determine whether or not the response to the request packet was successful.

Since an r Code reporting that the response has failed has been recorded in the dummy response packet, the decision section 11 determines that the response has failed, and communicates that decision result to the microcomputer 2. When this is done, the microcomputer 2 outputs a control command instructing interruption of the processes to the transmitting device 3, the receiving device 4, and the like; the series of processes is interrupted, and a process such as retransmitting the request packet is conducted.

When the reception information acquisition section 9 acquires the source ID, the tLabel, and the rCode from the dummy response packet and outputs these to the receive queue 7, the receiving device 4 outputs the dummy response packet to the microcomputer 2.

The microcomputer 2 stores the input dummy response packet in a memory region, and by means of reading out the added information from the dummy response packet, the microcomputer 2 can complete the transaction.

As was explained above, with the data processing device of this embodiment configuration, when the transmission information acquisition section 8 acquires a destination ID and a tLabel and outputs these to the transmit queue 5, the transmitting device 3 can immediately transmit a new request packet. As a result of that, even if a response to a request packet has failed, since the decision section 11 can detect the fact that the response failed, after that, the series of processes are interrupted and can respond afterwards to the failure of the response by retransmitting a request packet for the transaction for which the response failed.

Therefore, because the response failure is provided for, the transmitting device is different than in the past wherein a request packet could not be transmitted in the interval from the transmission of the request packet to the reception of a response packet, and since the transmission of request packets one after another can be done until it has been determined by the decision section 11 that an error has been generated, the transmission efficiency for the request packets can be improved compared to the past.

Also, even in the event a response packet cannot be received, a dummy response packet is generated at the dummy response packet generating section 10, and by reading out the destination ID, the tLabel, and the rCode in the same manner as with the ordinary response packet, a determination can be made as to whether the response to the request packet was successful.

Also, since it can be determined that that packet is a dummy response packet by reading out the added information from the response packet, the fact that the response packet was not received can be confirmed based on the transaction in which the dummy response packet was created. Therefore, the fact that the response packet was not received can be detected without conducting the special processes as was done in the past.

Also, for example, in the event the data processing device 1 transmits a plurality of request packets one after another, a plurality of response packets are returned to the other party data processing devices, the plurality of data from the other party data processing devices are read out, and sequentially stored in the microcomputer 2, and even if dummy response packets are stored in the microcomputer 2 along with other response packets, the dummy response packets can be differentiated from the other response packets.

In regard to transactions in which a dummy response packet is created, data is deleted but since the dummy response packet can be differentiated from the other response packets, the request packet used in that transaction is retransmitted and the deleted data can be supplemented later.

Also, in this embodiment configuration, the input of the transmit queue 5 is connected to the transmission information acquisition section 8, the inputs of the receive queue 7 are connected respectively, to the reception information acquisition section 9 and the transmission information acquisition section 8, and the outputs of the transmit queue 5 and the receive queue 7 are both connected to the decision section 11.

Because of this, regardless of the presence or absence of a response packet return, the destination ID and the t Label of the response packet are written to the transmit queue (5); and on the other hand, when the response packet is not returned, the destination ID, tLabel, and the transmission results of the request packet are written to the transmit queue (5); and when the response packet is returned, the source ID, the tLabel, and the rCode of the response packet, are written to the receive queue (7), respectively.

Therefore, when the response packet is not returned, the decision section 11 can determine the presence or absence of an abnormality by referencing the destination ID and the tLabel of the transmit queue 5, and the destination ID, the tLabel, and the transmission results of the receive queue 7; and on the other hand, when the response packet is returned, can determine the presence or absence of an abnormality by referencing the destination ID and the tLabel of the transmit queue 5, and the source ID, tLabel, and the rcode of the receive queue 7. Then, regardless of the presence or absence of a response packet return, the decision section 11 can determine the transmit condition for the request packet by the same operation of referencing the storage contents of the transmit queue 5 and the receive queue 7.

With this embodiment configuration, the transmit queue 5 and the receive queue 7 are composed of a memory of a FIFO construction, but this invention is not limited to this, and memories other than that can also be used.

Also, in this embodiment configuration, a transmit queue 5 and a receive queue 7 are provided, but it can also be constructed to directly connect the transmission information acquisition section 8 and the reception information acquisition section 9 to the decision section 11 without providing these.

Also, in this embodiment configuration, the microcomputer 2 determines the fact that a response packet has not been received by reading out the added information from a dummy response packet, but this invention is not limited to this, for example, it can also be constructed such that the receiving device 4 makes that determination by reading out the added information and communicating to the transmitting device 3 the fact that a response packet was not received.

what is claimed is:

1. A data processing device comprising
    a processing device that creates a request packet,
    a transmitting device that is connected to a serial bus, transmits said request packet to said serial bus, and transitions to a confirmation signal wait condition,
    a receiving device that is connected to said serial bus, receives a response packet and a first confirmation signal or a second confirmation signal that is a response corresponding to said request packet from said serial bus, outputs said first or second confirmation signal to said transmitting device, and outputs a response request to said processing device;
    an information transmission storage device that stores the transmission information contained in said request packet for the purpose of specifying a request packet;
    a reception results storage device that stores reception information contained in a response packet for the purpose of specifying said transmission information and transmission results or the response packet and condition notification information showing the response condition of the response packet,
    wherein said transmitting device outputs said transmission information to a transmission information storage device at the time of transmitting said request packet, and in the event said confirmation information is said first confirmation signal outputs transmit results showing said transmission information and said first confirmation signal to said reception results storage device and transitions to a condition in which it is possible to transmit a new request packet;
    wherein said processing device, based on said transmission information stored in said transmission information storage device, and said transmission information and said transmit results stored in said reception results storage device, determines whether or not a series of processes have been normally conducted by means of the transmission of said request packet;

wherein said transmitting device has a dummy response request packet generator that, in the event said request packet has not been received even though a prescribed time has elapsed after said second confirmation signal has been received, generates a dummy request packet containing said reception information for the response packet that should have been received, said condition notification information, and the recognition information, and wherein said receiving device, along with outputting said reception information and said condition notification information for said dummy response request to said reception results storage device, outputs said dummy response request to said processing device; and said processing device, based on said transmission information stored in said transmission information storage device, and said reception information and said condition notification information stored in said reception results storage device, determines whether or not a series of processes have been normally conducted by means of the transmission of said request packet.

2. A data processing device of claim 1 wherein said transmitting device that, in the event said confirmation signal is said second confirmation signal, transitions to a condition in which it is possible to transmit a new request packet; said receiving device receives said response packet and outputs said reception information and said condition notification information to said reception results storage device; and said processing device, based on said transmission information stored in said transmission information storage device, and said reception information and said condition notification information stored in said reception results storage device, determines whether or not a series of processes have been normally conducted by means of the transmission of said request packet.

3. A data-processing device of claim 2 wherein said request packet, said response packet, and said serial bus are constructed to conform to the IEEE 1394 standards.

4. A data-processing device of claim 3 wherein said transmission information is composed of a destination ID and a tLabel, said reception information is composed of a source ID and a tLabel, and said condition notification information is composed of an rCode.

5. A data-processing device of claim 1, wherein said request packet, said response packet, and said serial bus are constructed to conform to the IEEE 1394 standards.

6. A data-processing device of claim 4, wherein said transmission information is composed of a destination ID and a tLabel, said reception information is composed of a source ID and a tLabel, and said condition notification information is composed of an rCode.

* * * * *